United States Patent

Liepa

[15] 3,693,533
[45] Sept. 26, 1972

[54] MEAT ANALOG APPARATUS

[72] Inventor: Alexander L. Liepa, Cincinnati, Ohio

[73] Assignee: The Procter & Gamble Company, Cincinnati, Ohio

[22] Filed: Dec. 28, 1970

[21] Appl. No.: 101,930

[52] U.S. Cl. ........99/234 R, 99/443 C, 100/DIG. 10, 100/93 RP
[51] Int. Cl. ...............................A21c 3/04
[58] Field of Search......99/234, 237, 238 R, 238 PD, 99/361, 443, 14, 17; 100/93 S, 93 RP, DIG. 3, DIG. 10; 107/1, 9, 10, 12, 14; 18/12; 17/32

[56] References Cited

UNITED STATES PATENTS

| | | |
|---|---|---|
| 1,881,171 | 10/1932 | Cooley............100/DIG. 3 UX |
| 2,070,850 | 2/1937 | Trabold............99/443 C UX |
| 2,595,865 | 5/1952 | Lunsford.................107/10 X |
| 2,642,013 | 6/1953 | Enoch.........................107/12 |
| 2,752,629 | 7/1956 | Shadid...........................17/32 |
| 2,915,957 | 12/1959 | Bowman................99/238 PD |
| 2,951,456 | 9/1960 | Olgiati.....................107/12 X |
| 2,975,470 | 3/1961 | Snelson et al. ......100/93 RP X |
| 3,052,559 | 9/1962 | Peebles........................99/361 |
| 3,191,229 | 6/1965 | Vanzo................100/93 S UX |

Primary Examiner—Walter A. Scheel
Assistant Examiner—Arthur O. Henderson
Attorney—John V. Gorman and Richard C. Witte

[57] ABSTRACT

An apparatus for continuously producing a slab of fibrous, meat-like product in which amorphous heat coagulable dough is forwarded from a hopper by converging conveyors which induce substantially unidirectional transverse distension of the dough which distended dough, upon being heated sufficiently to induce coagulation, is transformed into a meat-like slab of substantially parallel, bonded, fibers.

26 Claims, 7 Drawing Figures

INVENTOR.
Alexander L. Liepa
BY
ATTORNEY

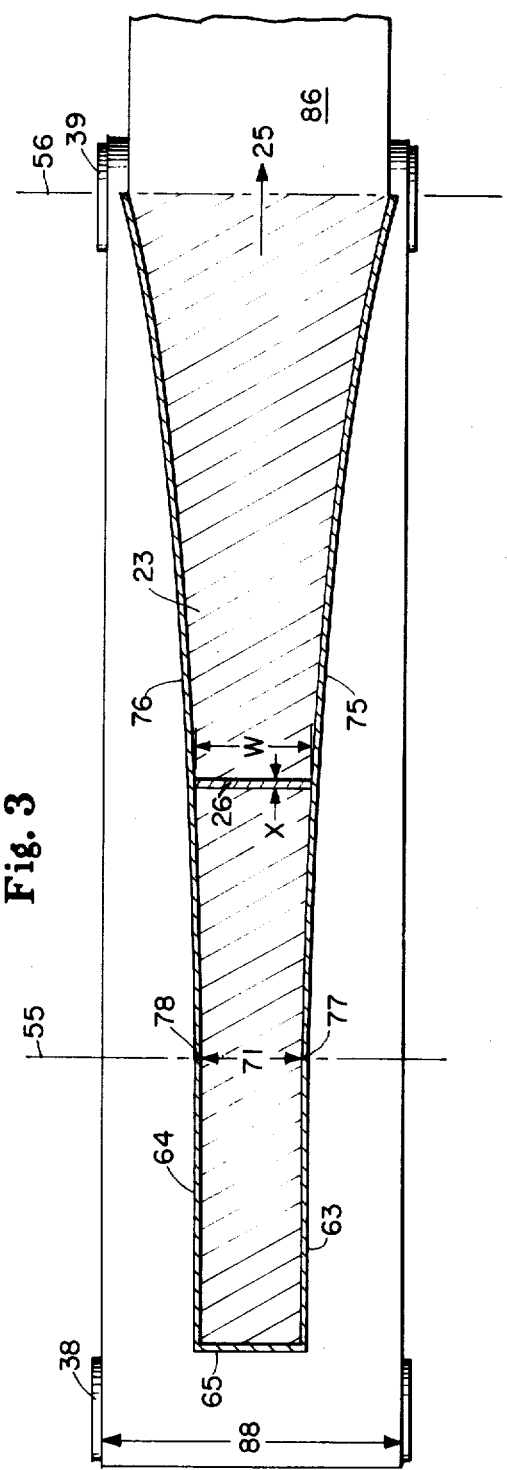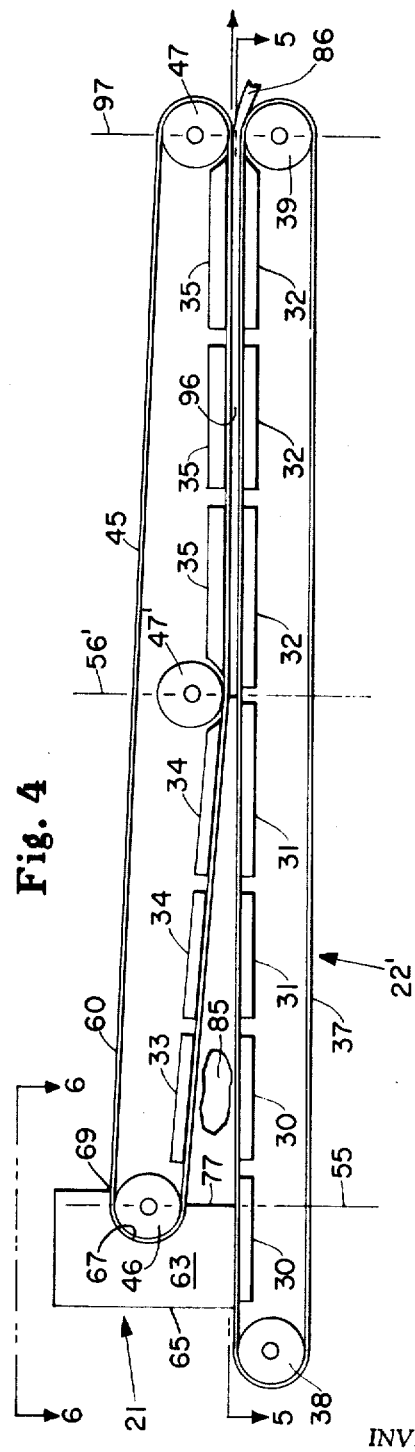

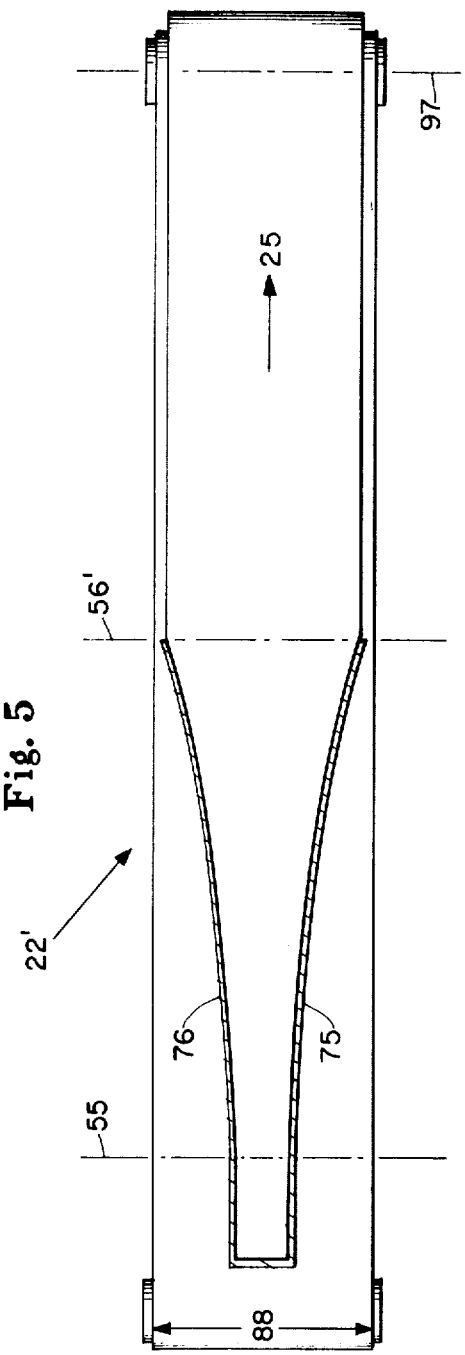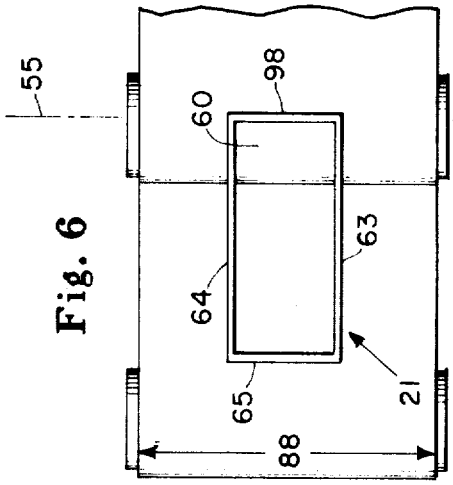

PLAN CONTOURS OF SPACERS 75, 76 TO FORM CONVERGENT SPACES, 23 HAVING CONSTANT CROSS SECTIONAL AREAS

SLAB WIDTH vs. CONVEYOR DISPLACEMENT FOR CONVERGENCE RATIOS AS INDICATED

INVENTOR.
Alexander L. Liepa
BY
ATTORNEY

MEAT ANALOG APPARATUS

FIELD OF THE INVENTION

This invention relates generally to the field of making high protein meat-like material from vegetable protein material as a means of supplying world nutritional requirements in a palatable form at a reasonable cost. Of course, in order to be meat-like, a meat analog product would be expected to have the factors of appearance and chewiness derived from a fibrous structure wherein the fibers are generally parallel and bonded together.

BACKGROUND OF THE INVENTION

Currently, fibrous meat analogs are produced by fiber spinning techniques similar to the manufacture of nylon filament, or by extrusion of plasticized protein material through dies.

The fiber spinning technique is discussed in detail in Boyer's U.S. Pat. No. 2,682,466 issued June 29, 1954, Boyer's U.S. Pat. No. 2,730,447 issued Jan. 10, 1956, and in U.S. Pat. No. 2,730,448 issued to Boyer et al. Jan. 10, 1956. The method of extruding plasticized protein material through dies is discussed in U.S. Pat. No. 3,102,031 issued to MacAllister et al. Aug. 27, 1963, Atkinson's U.S. Pat. No. 3,488,770 issued Jan. 6, 1970, and British Pat. No. 1,105,904 published Mar. 13, 1968 and British Pat. No. 1,174,906 published Dec. 17, 1969, both of which were issued to the Ralston Purina Company. Also, the process of making meat analogs is further discussed in the commonly assigned application of Jih Hsin Yang and Robert A. Olsen, entitled "MEAT ANALOGS HAVING THE FIBER STRUCTURE OF MEAT", Ser. No. 77,032, filed Sept. 30, 1970 which is hereby incorporated by reference.

These methods wherein fibers of proteinaceous material are formed must necessarily be followed by fiber bundling and bonding steps to convert them into meat-like masses. The instant invention is addressed to the simplification of manufacturing meat analog products by eliminating such fiber bundling and bonding process steps.

OBJECTS OF THE INVENTION

It is an object of this invention to provide apparatus that will unidirectionally distend a conveyed strip of amorphous dough.

It is another object of this invention to provide an apparatus which unidirectionally distends a conveyed strip of amorphous heat coagulable dough and causes the dough to be heated to the temperature range that will induce coagulation.

It is yet another object of this invention to provide an apparatus that will continuously forward a strip of heat coagulable dough from a hopper and to unidirectionally distend the forwarded dough while heating it whereby a uniformly shaped slab of meat-like material having parallel bonded fibers is produced.

It is a further object of this invention to provide an apparatus to continuously forward a strip of distensible, amorphous, coherent, heat coagulable dough so that it is first caused to be unidirectionally distended, and subsequently heated to a temperature in the range of temperature that will induce coagulation whereby a slab of meat-like product having bonded, generally parallel fibers is formed.

SUMMARY OF THE INVENTION

An apparatus is disclosed for continuously producing a slab of meat-like material from vegetable proteinaceous material wherein an amorphous, heat-coagulable dough is unidirectionally distended and coagulated. Amorphous, heat-coagulable dough is conveyed from a hopper through a convergent space formed by converging endless belt conveyors which induce distension transverse the conveyor belts. As the dough is conveyed through the apparatus it is heated to a temperature that will induce coagulation before the dough issues from the apparatus whereby the distended amorphous dough is transformed into a slab of meat-like product having parallel, bonded fibers extending generally transverse the conveyor belts.

BRIEF DESCRIPTION OF THE DRAWINGS

While the specification concludes with claims particularly pointing out and distinctly claiming the subject matter that is regarded as the present invention, it is believed that the invention will be better understood by the following description taken in conjunction with FIGS. 1 through 7.

FIG. 3 is a fragmentary sectional view taken along line 3—3 of FIG. 1.

FIG. 4 is a fragmentary side elevational view of an alternate embodiment of the present invention.

FIG. 5 is a sectional view taken along line 5—5 of FIG. 4.

FIG. 6 is an enlarged, fragmentary plan view of one end of the apparatus shown in FIG. 4 and is taken along line 6—6 of FIG. 4.

DESCRIPTION OF THE PREFERRED EMBODIMENT

Figure 1:
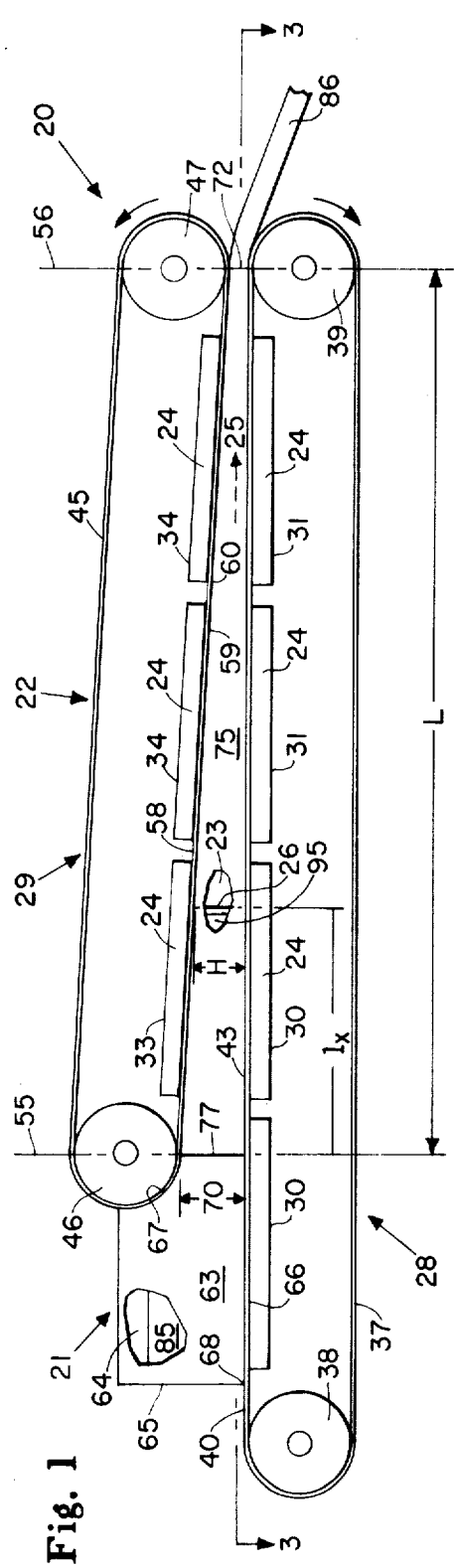
FIG. 1 is a fragmentary side elevational view of a preferred embodiment of the present invention.

Referring to the drawings, and in particular to FIG. 1, meat analog apparatus 20 comprises hopper 21, conveying means 22 forming convergent space 23, and heating means 24 to heat material that is conveyed through convergent space 23.

This apparatus is adapted to forward a mass of heat-coagulable, amorphous, coherent dough 85 from hopper 21 through convergent space 23 wherein it is squeezed to reduce its thickness whereby the dough is caused to be unidirectionally distended transverse the direction of conveyance 25. Heating means 24 heats the dough to a temperature in the range of temperatures required to induce coagulation of the dough as it is being distended. Coagulation, while being unidirectionally distended, results in the transformation of the dough into a slab of meat-like product 86 having generally parallel bonded fibers.

To describe the preferred embodiment more specifically, conveying means 22, FIG. 1, comprises lower conveyor 28, upper conveyor 29, support plates 30, 31, backup plates 33, 34, and drive and synchronization means not depicted in the figures. It also comprises spacer 75, FIGS. 1 and 3 and spacer 76, FIG. 3.

Lower conveyor 28, FIG. 1, has an endless first belt 37 looped about rollers 38, 39, so that an upwardly facing, planar portion 40 of first belt 37 is formed. Support plates 30, 31, subjacent planar portion 40 and in sliding abutting relationship thereto are provided to maintain outer surface 43 of planar portion 40 in a substantially horizontal plane.

Upper conveyor 29, FIG. 1, comprises endless second belt 45 looped about rollers 46, 47, which are rotatably mounted with substantially parallel, horizontal axes. As depicted in FIG. 1, upper conveyor 29 is canted downwardly to the right from roller 46 to roller 47. The axis of roller 47 is directly above the axis of roller 39 although this is not considered critical to the invention.

In order to more simply describe the balance of the preferred embodiment, two vertical reference planes related to the geometry of the preferred embodiment are hereby designated: feed plane 55 through the axis of roller 46; and end-squeeze plane 56 through the axis of roller 39.

Continuing with the description of upper conveyor 29, FIG. 1, backup plates 33, 34 are provided adjacent the inner surface 58 of downwardly facing straight run 59 of second belt 45 whereby forces acting upwardly on outer surface 60 of straight run 59 will maintain straight run 59 in a planar configuration in sliding relationship with backup plates 33, 34. Straight run 59 extends from feed plane 55 to end-squeeze plane 56.

Although the number of support plates 30, 30, 31, 31, and the number of backup plates 33, 34, 34 are not considered critical, the apparatus depicted in FIG. 1 has 3 backup plates and 4 support plates. Controlled temperature heating means 24 are provided for individually heating and controlling their temperatures through the range of temperatures that will induce coagulation or coagulation and cooking of heat coagulable dough.

Stationary, arcuate spacers 75, 76, FIG. 3, extend divergently from feed plane 55 to end-squeeze plane 56 forming sides of convergent space 23. FIG. 1 shows that spacer 75 abuts hopper side 63, at vertical line 77, in feed plane 55. Similarly, FIG. 3, spacer 76 abuts hopper side 64 at vertical line 78 in feed plane 55. Being stationary, spacers 75, 76 are adapted to slidingly seal against first belt 37 and second belt 45 along their full length as the belts move.

Convergent space 23 can be considered to be an infinite number of abutting, vertical, imaginary transverse sections 26 of length X, FIG. 3, disposed at right angles to direction of conveyance 25. The divergence of spacers 75, 76 and the convergence of the conveyors are interdependent in such a manner that all imaginary transverse sections 26 are substantially equal in area. That is, the product of height H, FIG. 1, times width W, FIG. 3 of each transverse section 26 is substantially constant. However, this constant area relationship may be varied by an amount to compensate for dough characteristics such as thermal expansion coefficients which characteristics are hereinafter explained in greater detail.

Thus, convergent space 23, when viewed from the side, FIG. 1, is defined by feed plane 55, end-squeeze plane 56, outer surface 43 of first belt 37, and outer surface 60 of second belt 45, and when viewed from the top, FIG. 3, is seen to have its sides defined by spacers 75, 76.

Drive means, not shown in the figures, is drivingly connected to the conveyors so that the opposed portions of their respective endless belts are synchronously moved at constant velocity in the direction of conveyance 25.

Figure 2:
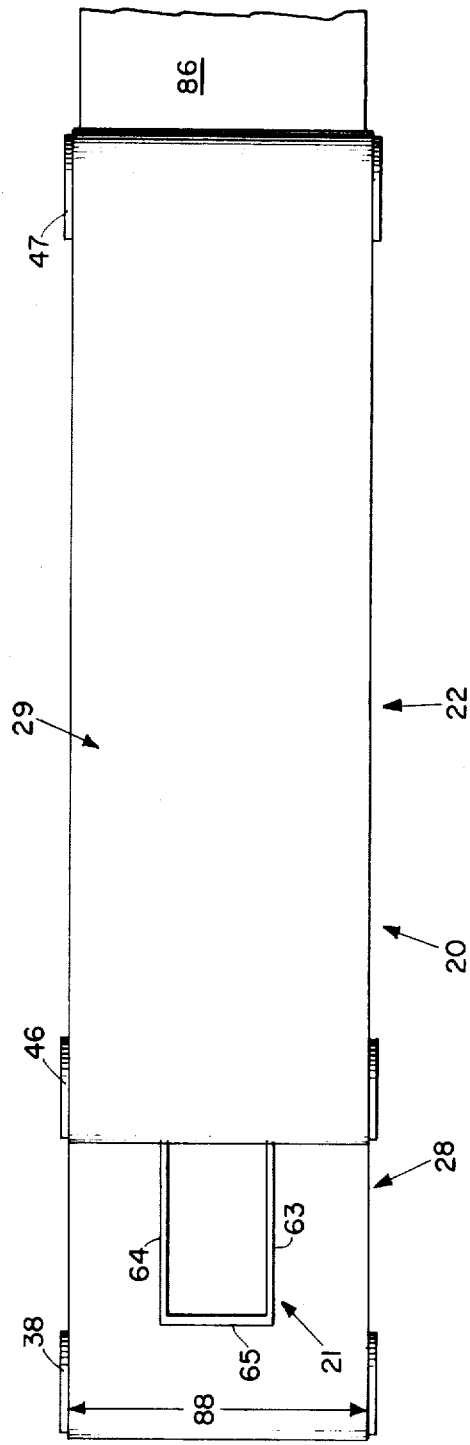
FIG. 2 is a fragmentary plan view of the apparatus of FIG. 1.

Hopper 21, FIG. 2, comprises sides 63, 64, and back 65. Side 63, in FIG. 1, and side 64 are configured to extend under second belt 45 to feed plane 55 and to be in sliding abutting relationship with first belt 37 along their bottom edges 66 and with a portion of second belt 45 along their arcuate edges 67. Also, bottom edge 68 of back 65 is in sliding abutting relationship to first belt 37. Thus, the hopper has an outlet that dispensingly communicates with convergent space 23 across an area of feed plane 55 having height 70, indicated in FIG. 1, and width 71, indicated in FIG. 3. The hopper also communicates with the upwardly facing portion of first belt 37 defined by edges 66, 66, 68, and feed plane 55, and with a portion of second belt 45 intermediate arcuate edges 67.

In operation, a quantity of heat-coagulable, amorphous, coherent dough 85 is placed in hopper 21. It will be forwarded into convergent space 23 beginning at feed plane 55 as the conveyor driving means causes the belts to synchronously advance in direction of conveyance 25. The action of advancing belts 37, 45, in combination with gravity, forms and forwards a mass of dough having height 70 and width 71 at plane 55 from hopper 21 into convergent space 23. As the dough is further conveyed through convergent space 23, belts, 37, 45 squeezingly act thereon in a manner to progressively decrease the height of the dough.

In order to understand the ramifications of squeezingly acting on the dough, assume, for the moment, that each imaginary transverse section 26 of convergent space 23 is filled with dough 85. Thus, transverse sections of dough, designated hereinafter by 26', are defined as the dough that fills the imaginary transverse sections 26 of convergent space 23. Each transverse section of dough 26' is dammed by the abutting transverse sections of dough. Such damming inhibits the dough from moving faster or slower than the belts advance in direction of conveyance 25. Thus, the squeezing action of the conveyors will cause each transverse section of distensible dough 26', as it successively passes through the infinite number of imaginary transverse sections 26, if the dough is essentially incompressible, to be unidirectionally distended horizontally as its height decreases so that the dough exactly fills each succeeding imaginary transverse section 26. Such unidirectional distention, with resultant width increases, in combination with being heated to a temperature within the range of temperatures that will induce coagulation, causes the heat coagulable dough to be transformed into a bonded mass of transversely extending parallel fibers as it coagulates. Thus, a mass of amorphous, heat coagulable dough 85 being forwarded through convergent space 23 is transformed into a slab of meat-like product having parallel transversely extending fibers as it is moved towards end-squeeze plane 56 whereby a slab of meat-like product 86 will continuously issue from meat analog apparatus 20.

Because distensible heat coagulable doughs of proteinaceous material commonly have some propensity to flow, albeit as a very viscous fluid, spacers 75, 76, FIG. 3 are incorporated into the apparatus to prevent width increasing transverse flow within the sections of dough except such flow as is induced by the squeezing action of the convergent conveyors and volumetric changes in the dough caused by heat or other dough properties. Uninhibited free fluid flow of the dough is intentionally precluded.

Thus, the primary function of spacers 75, 76 is to exactly confine all of the transverse sections of the mass of dough being conveyed through the apparatus to insure that product issuing from the apparatus is of uniform cross-sectional shape and size. The spacers should diverge sufficiently to accommodate squeeze induced transverse flow, thermal expansion, and other dough properties tending to change its density in the apparatus but should preclude transverse fluid flow that would otherwise destroy the desired uniformity of cross-sectional shape and size of the slab issuing from the apparatus. Due to the presence of the spacers, the issuing slab of meat-like product will be uniformly sized and shaped.

If compacted, higher density product is desired, the spacers can be contoured to diverge at a rate less than squeeze induced transverse flow, thermal expansion, and other dough properties hereinbefore alluded to would otherwise require. Thus, the contour of the spacers can be used to control the density of the finished product in addition to their primary function of assuring uniformity of size and shape of issuing product.

In order to establish uniform cross-sectional areas $A_x$ of all imaginary transverse sections 26, as hereinbefore delineated, the plan contour of spacers 75, 76 is determined by the following relationship between the height of any transverse section 26 which is hereby designated $H_x$, FIG. 1, and the width of any transverse section 26 which is hereby designated $W_x$, FIG. 3:

$$H_x W_x = A_x \qquad (1)$$

$$W_x = A_x / H_x \qquad (2)$$

Assuming that the opposed portions of the endless conveyor belts are planar throughout the entire length of convergent space 23, $H_x$ is found by the equation $$H_x = h_1 - \frac{l_x(h_1 - h_2)}{L} \qquad (3)$$

where $h_1$ is the height 70 of convergent space 23 in feed plane 55, $h_2$ is the height 72 of convergent space 23 in end-squeeze plane 56, $L$ is the length of convergent space 23, and $l_x$, the conveyor displacement, is the distance between transverse section 26 and feed-plane 55. Then, by substitution of $H_x$ from (3) into (1), $$W_x = \frac{A_x}{h_1 - \frac{l_x(h_1 - h_2)}{L}} \qquad (4)$$

Figure 7:
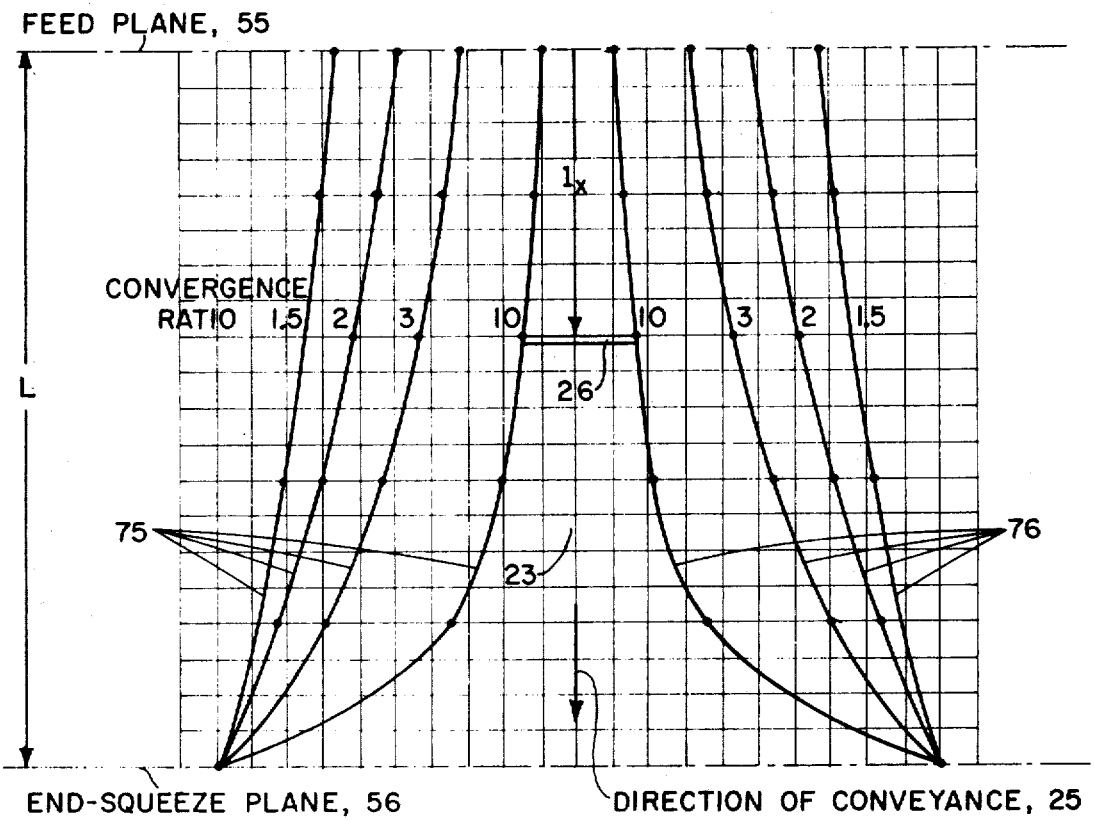
FIG. 7 is a plan view of the contours of several sets of spacers having convergence ratio dependent configurations.

Using equation (4), the plan contour of spacers 75, 76 can then be determined for any specific apparatus geometry if $A_x$, $L$, $h_1$, and $h_2$ are established. For instance, FIG. 7 is a composite plan view of several sets of convergence ratio dependent spacers that would provide uniform cross-sectional areas of transverse vertical sections 26 throughout the length L of convergent space 23. All sets of spacers, FIG. 7, are configured to yield the same final cross section regardless of convergence ratio so that all sets theoretically yield the same shaped final product slab. Each set is determined by a specific convergence ratio which is defined as the ratio of the height 70 of convergent space 23 in feed plane 55 to the height 72 of convergent space 23 in end-squeeze plane 56. Of course, the side elevational view, FIG. 1, shows the side elevation of all of the sets of spacers 75, 76 to be identical.

It is obvious from FIG. 7 that the relationship between dough width and conveyor displacement $l_x$ is more nearly linear at small convergence ratios as opposed to large convergence ratios. That is, the rate of induced transverse flow is most nearly constant over the entire length of convergent space 23 for low convergence ratios, while high convergence ratios are characterized by rapidly increasing rates of width increasing transverse flow vs. conveyor displacement $l_x$ as dough approaches end-squeeze plane 56. It is believed that near-linearity would be desirable so that each portion of the apparatus contributes approximately equally to the final result.

The foregoing discussion assumed that the volume of dough in each transverse section of dough 26' was constant in order to derive a plan contour function for compatible spacers 75, 76. However, such volumetric contancy may not be realizable due to parametric dough properties. The volume of a transverse section of dough 26' may be affected by temperature, moisture, or other dough properties as it is being conveyed through convergent space 23.

Volumetric changes are, of course, proportional to the areas $A_x'$, of transverse sections of dough where the transverse sections have uniform thickness maintained by longitudinal damming of the dough; where the dough is restrained from longitudinal flow relative to the conveyor belts.

Parametric dough properties such as its volume vs. temperature relationship can be incorporated into equation (4) to insure that the cross sectional area $A_x$ of each transverse section 26 of convergent space 23 is sufficient to exactly accommodate volumetric changes in the transient transverse sections 26' of dough to insure that the shape of the transient sections of dough continuously conform to the cross sectional shape of convergent space 23 throughout the entire length of convergent space 23.

For instance, assume that increasing the temperature $t_x$ of a transverse section of dough 26' as it is conveyed through convergent space 23 induces change in its volume $V_x$ which is a function of the displacement $l_x$ of the section from feed plane 55 and $t_x$. This can be expressed as $$V_x = f_1(l_x, t_x) \qquad (5)$$

Because of the constant thickness of the transverse section of dough 26' due to dammed longitudinal flow, the area $A_x'$ of the transverse section of dough 26' is also a function of $l_x$, $t_x$. That is, $$A_x' = f_2(l_x, t_x) \qquad (6)$$

For the transverse section of dough 26' having area $A_x'$ to exactly match the area $A_x$ of transverse section 26 of convergent space 23, $A_x$ must equal $A_x'$. That is, $$A_x = A_x' \qquad (7)$$

By substitution of the value of $A_x'$ from equation (6) into equation (7), $$A_x = f_2(l_x, t_x) \qquad (8)$$

Finally, by substitution of the value of $A_x$ from equation (8) into equation (4), $$W_x = \frac{f_2(l_x, t_x)}{h_1 - \frac{l_x(h_1 - h_2)}{L}} \qquad (9)$$

Thus, equation (9) would be the plan contour function of spacers 75, 76 that would exactly accommodate squeeze and temperature induced transverse distension.

Of course, it will be obvious to those having ordinary skill in the art that the plan contours of spacers 76,76 that will accommodate such parametric dough properties could be empirically determined as could the parametric functions themselves.

Although the foregoing discussion was based on pure transverse flow which is defined as transverse flow of dough in the absence of longitudinal flow of dough in direction 25 relative to conveyor belts 37,45, pure transverse flow is not considered essential to the invention. However, the fibrous-appearance quality of the product increases as pure transverse flow is approached.

Notwithstanding the importance of the plan contours of spacers 75, 76 as hereinbefore delineated and derived, a meat-like product has been made with apparatus configured as shown in FIG. 1 but without spacers 75, 76.

In the apparatus that was operated without spacers 75,76, belts 37, 45 are 0.012 inch thick stainless steel, 18 inches wide. They are disposed to form a convergent space 23 that is 106 inches long having height 70 in feed plane 55 of 2 inches and height of 72 of 1 inch in end-squeeze plane 56. The outlet of the hopper in feed plane 55 is 2 inch high (height 70) and is 8 inch wide (width 71). When dough, prepared as described in Example 5 of the incorporated referenced application, Ser. No. 77,032, filed Sept. 30, 1970, by Jih Hsin Yang and Robert A. Olsen, is processed at 250° F, belt velocity of 10 feet/hour is suitable although not extremely critical.

Of course it is necessary to operate the belts at such a velocity, dependent on the length of convergent space 23 and dependent on the disposition and intensity of heating means 24 to provide a residence time of the dough within convergent space 23 to insure coagulation of dough before it passes end-squeeze plane 56. For instance, the apparatus described above could be operated at a faster velocity than 10 feet/hour if convergent space 23 was lengthened or if a higher temperature than 250° F. were used. However, too high a temperature would overcook the dough so there are practical temperature limits. The temperature must be high enough to induce coagulation but not so high that the dough is overcooked or burned.

Although the apparatus as described above has a convergence ratio of 2:1, that ratio is not considered to be critical to the invention although best results would be expected to occur with a convergence ratio in the range of from about 1:1 to about 3:1. And, although the length of convergent space 23 of this apparatus is 106 times the height 72, this exact relationship is not considered critical to the invention. However, it is believed that best results would be expected to occur with the length being at least about 15 times height 72 so that there is effective damming of longitudinal flow of dough, Longer lengths would permit commensurate belt velocity increases whereby the rate of producing product would be proportionately increased.

Without spacers 75, 76, the issuing slab of product 86 was of uniform height only through the central portion of the slab with the height tapering off towards the edges. It is believed that the absence of spacers allowed the fluid property of the dough to cause it to flow transversely at a rate faster than the rate that would have been induced solely by the squeezing action of the convergent conveyors and volumetric changes in the dough induced by such factors as thermal expansion. The non-uniform cross section of such a product is considered inferior to a slab of uniform rectangular cross section that issues from apparatus having spacers configured as taught hereinbefore because it does not readily lend itself to uniform packaging nor apportioning.

Another mode of operating the preferred embodiment of the instant invention is to maintain a portion of the mass of dough adjacent feed plane 55 at a temperature lower than the temperature range that would induce heat coagulation of heat-coagulable dough. This creates a thicker dam of uncoagulated dough within convergent section 23 than otherwise, which will resist backflow of dough undergoing coagulation in the remaining portion of convergent space 23. For instance, referring to FIG. 1, the portion of convergent space 23 adjacent feed plane 55 and intermediate the portions of belts 37, 45 that are adjacent to backup plate 33 and support plates 30, 30 is hereby designated as cooler portion 95. Thus, by maintaining the temperature of the mass of dough passing through cooler portion 95 at a temperature below the range that would induce coagulation, that portion of the dough is a dam-like mass of uncoagulated dough that resists backflow within coagulating dough as the belts squeezingly act thereon. Thus, by not being free to expand or flow rearwardly towards hopper 21, transverse flow of dough is enhanced. Also, it is believed that transverse flow thus induced in cooler portion 95 prior to the beginning of heat-induced coagulation establishes transverse stress lines which enhance the eventual coagulation/formation of bonded parallel fibers extending transverse convergent section 23.

An alternative embodiment of the instant invention is shown in FIGS. 4, 5, and 6. Elements having the same functions as in the preferred embodiment are identically designated.

However, the alternate embodiment comprises rectangular parallelepipedal space 96, FIG. 4, which is formed in tandem with convergent space 23 by adding intermediate roller 47' to the upper conveyor. Also, hopper 21 is shown in FIGS. 4 and 6 to extend over an upwardly facing portion of the outer surface 60 of second belt 45 for reasons which will hereinafter be delineated. For convenience, vertically disposed outlet plane 97 is hereby defined as the vertical plane through the axis of roller 39 while end-squeeze plane 56' is vertically disposed through the axis of roller 47'. As most clearly seen in FIG. 5, arcuate spacers 75, 76 extend only from feed plane 55 to end-squeeze plane 56'. They are thus configured on the basis that coagulation will be completed by the time the dough passes end-squeeze plane 56' thereby obviating the need for supporting the sides of the slab of dough conveyed through parallelepipedal space 96.

As in the preferred embodiment, support plates 30, 31, 32, FIG. 4, and backing plates 33, 34 and 35 of the alternate embodiment are independently heated, by means not shown, to independently controlled temperatures which are controlled by temperature selection and control means not shown in the figures.

Referring now to FIG. 6, hopper 21 is seen to comprise front 98, sides 63, 64, and back 65. Front 98 is slidingly sealed against an upwardly facing outer portion of second belt 45 along edge 69, FIG. 4. Sides 63, 64 are extended to slidingly seal against second belt 45 along arcuate edges 67, 67 extending from edge 69 to feed plane 55. Therefore, by maintaining dough 85 within the hopper at a higher level than the upwardly facing outer surface of second belt 45, gravity will hold it downwardly against the area of the outer belt defined by edges 67, 67 and 69. It is believed that the sticky property of the dough, in combination with the greater pressure which the increased head of dough of this configuration induces will cause belts 37, 45 to have a greater tendency to pull dough into convergent space 23 as they advance towards feed plane 55 than the hereinbefore described hopper configuration of the preferred embodiment that does not extend over an upwardly facing portion of second belt 45.

The alternate embodiment is operated in such a manner that transverse flow and coagulation occur before the dough passes end-squeeze plane 56' as in the preferred embodiment in which case the function of parallelepipedal space 96 would be to contain the meat-like slab 86 as it is cooked before it issues from the apparatus. When operated in this manner, support plates 30, 30, 31, 31 and backup plates 33, 34, 34 would be operated at temperatures that would insure coagulation prior to passing end-squeeze plane 56' but not hot enough to cook dough. Then, support plates 32 and backup plates 35 would be heated to a temperature within the range required to cook the product as it is conveyed through parallelepipedal space 96.

Another alternate embodiment of the instant invention, not illustrated in the Figures, is identical to the first alternate embodiment illustrated in FIGS. 4–6 except that spacers 75, 76 extend from feed plane 55 to outlet plane 97. This embodiment permits sequentially distending the dough and then coagulating it. Distension is induced in the dough as it is conveyed through convergent space 23 and coagulation is subsequently heat-induced within parallelepipedal space 96. The portions of spacers 75, 76 between feed plane 55 and end-squeeze plane 56' in this alternate embodiment of the instant invention are contoured to provide transverse sections 26 of uniform cross-sectional area throughout the length of convergent space 23 as hereinbefore described and the portions of spacers 75, 76 between end-squeeze plane 56' and outlet plane 97 are either straight and parallel or otherwise contoured to maintain rectangular transverse cross sections of dough passing through space 96. For instance, spacers 75, 76 can be contoured to accommodate heat-induced expansion while continuing to maintain rectangular cross sections of dough as described hereinbefore.

It will be realized by those having ordinary skill in the art that neither the preferred embodiment nor the described alternate embodiments exhaust the possible configurations of apparatus that could embody the instant invention. For instance, although only horizontally disposed apparatus is shown, other orientations would be suitable for practicing the instant invention. Also, heating by means other than conductive, such as by micro waves in combination with compatible belts, support plates, and backup plates is also contemplated to be within the scope of the instant invention. Also, greater or lesser angles or ratios of convergence than discussed or depicted herein may be necessary or suitable for use with doughs having different consistencies or constituents, and, many other changes can be made within the purview of this invention. Therefore, it is not intended to hereby limit the invention to embodiments shown, described, or suggested. The terms used in describing the invention are used in their description sense and not as terms of limitation.

What is claimed is:

1. A meat analog apparatus comprising:
a hopper having an outlet, said hopper adapted to hold and dispense a quantity of distensible, coherent, heat-coagulable, amorphous dough;
converging conveying means defining a convergent space extending intermediate a feed plane and an end-squeeze plane, said conveying means comprising a pair of converging endless belt conveyors forming said convergent space therebetween, and drive and synchronization means whereby facing portions of said endless belts move at constant, substantially equal velocities towards the narrower end of said convergent space, said convergent space communicating with the outlet of said hopper, said conveying means acting to continuously forward dough from said hopper into said convergent space forming a coherent web of said dough in said convergent space which web is then forwarded by said endless belt conveyors through said convergent space at a velocity substantially equal to the velocity of said endless belt conveyors squeezing said web as it is conveyed through said convergent space causing the thickness of said web to be gradually decreased therein, said squeezing inducing width-increasing transverse distension of said web, said convergent space being wide enough relative to the area of said outlet of said hopper and to the height of said convergent space to accommodate said transverse distension without compacting said web; and
controlled temperature heating means adapted to raise the temperature of said web as it is conveyed through said convergent space to a temperature that will induce coagulation of said heat-coagulable dough whereby said web is transformed into a continuous meat-like slab of substantially parallel, bonded fibers extending transverse said conveying means.

2. A meat analog apparatus comprising:
a hopper having an outlet, said hopper adapted to hold and dispense a quantity of distensible, coherent, heat-coagulable, amorphous dough;

converging conveying means defining a convergent space extending intermediate a feed plane and an end-squeeze plane, said conveying means comprising a pair of converging endless belt conveyors forming said convergent space therebetween, and drive and synchronization means whereby facing portions of said endless belts move at constant, substantially equal velocities towards the narrower end of said convergent space, said convergent space communicating with the outlet of said hopper, said conveying means being adapted to continuously forward dough from said hopper into and through said convergent space and to squeeze the dough as it is conveyed through said convergent space, whereby the thickness of said dough is gradually decreased therein, said conveying means being further adapted to simultaneously accommodate width-increasing distension of said dough that is induced by said squeezing, said conveyor means further comprising two spacers intermediate said convergent conveyor belts, said spacers forming sides of said convergent space, said spacers being contoured and disposed to accommodate apparatus induced transverse distension of dough conveyed therethrough but to substantially preclude gravity induced transverse fluid flow of said dough; and controlled temperature heating means adapted to raise the temperature of said dough as it is conveyed through said convergent space to a temperature that will induce coagulation of said heat-coagulable dough whereby said dough will be transformed into a meat-like slab of substantially parallel, bonded fibers extending transverse said conveying means, and whereby said apparatus will continuously issue said slab of meat-like product having uniform cross-sectional size and shape.

3. The apparatus of claim 2 wherein the portions of said endless belts which define said convergent space are substantially planar.

4. The apparatus of claim 3 wherein said planar portion of a first endless belt is substantially horizontal and subjacent the planar portion of the second endless belt.

5. The apparatus of claim 4 wherein said hopper is so configured that dough within said hopper communicates with substantial areas of upwardly facing surfaces of both said endless belts appurtenant to the thicker end of said convergent space whereby both endless belts will act to convey dough from within said hopper to said convergent space.

6. The apparatus of claim 5 having:
said conveying means so configured that the opposed end-less belts define a generally rectangular parallelepipedal space which is a tandem extension of said convergent space extending from the thinner end of said convergent space;
additional heating means adapted to heat dough conveyed through said parallelepipedal space to a temperature within the range required to cook said dough; and
said parallelepipedal space being of sufficient length that will provide sufficient residence time so that said dough will be suitably cooked therein at said cooking-temperature before it issues from said apparatus.

7. The apparatus of claim 2 having a convergence ratio in the range from about one to one to about three to one and wherein the length of said convergent space is about equal to or greater than fifteen times the height of said convergent space in said end-squeeze plane.

8. The apparatus of claim 7 wherein the outwardly facing portions of said endless belts which define said convergent space are substantially planar.

9. The apparatus of claim 8 having:
said conveying means so configured that the opposed endless belts also define a generally rectangular parallelepipedal space which is a tandem extension of said convergent space extending from the thinner end of said convergent space;
additional heating means adapted to heat dough conveyed through said parallelepipedal space to a cooking temperature within the range required to cook said dough; and
said parallelepipedal space being of sufficient length that will provide sufficient residence time so that said dough will be suitably cooked therein at said cooking-temperature before it issues from said apparatus.

10. The apparatus of claim 7 having a convergence ratio of about two to one.

11. The apparatus of claim 10 wherein said outwardly facing planar portion of the first endless belt is substantially horizontal and is subjacent the downwardly facing planar portion of the second endless belt.

12. The apparatus of claim 2 wherein said spacers are so contoured and disposed that the cross-sectional area of said convergent space is substantially constant throughout its length.

13. The apparatus of claim 12 wherein said hopper is so configured that dough within said hopper communicates with substantial, upwardly facing surfaces of both said endless belts appurtenant to the thicker end of said convergent space whereby both endless belts will act to continuously convey dough from within said hopper into and through said convergent space.

14. A meat analog apparatus comprising:
a hopper having a dispensing outlet, said hopper being adapted to hold and continuously dispense a stream of distensible, coherent, heat-coagulable, amorphous dough across the full area of said outlet;
conveying means consisting of two endless belts which have portions which face each other but are spaced apart forming a convergent space in tandem with a rectangular parallelepipedal space; said convergent space communicating with the outlet of said hopper, said conveying means causing the dough to be dispensed from said hopper and being adapted to squeeze said forwarded dough whereby the thickness of said dough is decreased as it is conveyed through said convergent space, said conveying means being further adapted to simultaneously accommodate width increasing distension of said dough induced by said squeezing;
said rectangular parallelepipedal space extending from the thinner end of said convergent space, said parallelepipedal space having a length that is sufficient to provide suitable residence time of said dough therein;

controlled temperature heating means adapted to sufficiently raise the temperature of said dough being conveyed through said rectangular parallelepipedal space to induce coagulation of said dough therein whereby said dough will be transformed into a meat-like slab of substantially parallel, bonded fibers extending transverse said conveying means; and drive means to synchronously move said endless belts at substantially constant speed that will, in combination with the heating means and the length of the apparatus, provide sufficient residence time for dough being conveyed therethrough to be coagulated therein.

15. The apparatus of claim 14 having a convergence ratio in the range of from about one to one to about three to one and wherein the length of said convergent space is at least fifteen times the height of said convergent space in said end-squeeze plane.

16. The apparatus of claim 14 having a convergence ratio of about two to one.

17. The apparatus of claim 14 having two spacers intermediate said conveyors, said spacers forming sides of said convergent space and said rectangular parallelepipedal space, said spacers being contoured and disposed to accommodate apparatus induced transverse distension of dough conveyed therethrough and to substantially preclude gravity induced transverse fluid flow of said dough whereby said apparatus will continuously issue a slab of meat-like product having substantially uniform cross-sectional size and shape.

18. The apparatus of claim 17 wherein said hopper is so configured that it communicates with substantial areas of upwardly facing surfaces of both said endless belts appurtenant to the thicker end of said convergent space whereby both endless belts will act on said dough within said hopper to forward dough from within said hopper to and through said convergent space.

19. The apparatus of claim 18 wherein the portions of said endless belts which define said convergent space and said parallelopipedal space are substantially planar.

20. The apparatus of claim 19 wherein said planar portions of the first endless belt are substantially horizontal and subjacent the planar portions of the second endless belt.

21. The apparatus of claim 17 wherein said spacers are so contoured that the cross-sectional area of said convergent space is substantially constant throughout its length.

22. The apparatus of claim 21 wherein the outwardly facing opposed portions of said endless belts which define said convergent spaces are substantially planar and horizontal.

23. The apparatus of claim 22 wherein said hopper is so configured that it communicates with substantial areas of the upwardly facing surfaces of both said endless belts appurtenant to the thicker end of said convergent space whereby both endless belts will act to convey dough within said hopper into said convergent space.

24. A meat analog apparatus comprising:
a hopper having an inlet and an outlet, said hopper adapted to hold a quantity of distensible, coherent, coagulable, amorphous dough, said hopper further adapted to continuously dispense dough through its outlet and to have additions of dough made independently through said inlet;

a pair of converging, endless conveyor belts defining a convergent space between opposed, outwardly facing portions of said belts extending from the outlet of said hopper, said conveyor belts being adapted to forward dough from said hopper through said convergent space and to squeeze dough conveyed therethrough, due to their convergence, whereby the thickness of said dough is gradually decreased therein, said belts being further adapted to accommodate width-increasing distension of said dough induced by said squeezing;

drive and synchronization means whereby opposed portions of said belts move at substantially constant and equal velocities, said velocities being adjustable to provide a residence time for dough passing through said apparatus to be coagulated therein; and controlled temperature heating means being adapted to heat said dough being conveyed through said convergent space to a temperature that will induce coagulation of said heat-coagulable dough within said convergent space but will not heat-coagulate a cooler-portion of said dough within said convergent space that is adjacent said outlet of said hopper.

25. The apparatus of claim 24 further comprising two spacers intermediate said convergent endless belts, said spacers forming sides of said convergent space, said spacers being contoured and disposed to accommodate apparatus induced transverse distension of dough conveyed therethrough but to substantially preclude gravity induced transverse fluid flow of said dough whereby said apparatus will continuously issue a slab of meat-like product having uniform cross-sectional size and shape.

26. The apparatus of claim 25 wherein said spacers are so contoured and disposed that the cross-sectional area of said convergent space is substantially constant throughout the length of said convergent space.

* * * * *

UNITED STATES PATENT OFFICE
CERTIFICATE OF CORRECTION

Patent No. 3,693,533        Dated    September 26, 1972

Inventor(s)   Alexander L. Liepa

It is certified that error appears in the above-identified patent and that said Letters Patent are hereby corrected as shown below:

Column 14, line 11, before the word "coagulable" insert
-- heat- --

Signed and sealed this 3rd day of April 1973.

(SEAL)
Attest:

EDWARD M. FLETCHER, JR.               ROBERT GOTTSCHALK
Attesting Officer                      Commissioner of Patents